United States Patent
Pope et al.

(10) Patent No.: US 8,614,157 B2
(45) Date of Patent: Dec. 24, 2013

(54) SINTERED PARTICLES AND METHODS FOR PRODUCING SINTERED PARTICLES FROM A SLURRY OF AN ALUMINA-CONTAINING RAW MATERIAL

(75) Inventors: William H. Pope, Eufaula, AL (US); Chad Cannan, Cypress, TX (US); Jimmy C. Wood, Eufaula, AL (US)

(73) Assignee: CARBO Ceramics, Inc., Houston, TX (US)

( * ) Notice: Subject to any disclaimer, the term of this patent is extended or adjusted under 35 U.S.C. 154(b) by 374 days.

(21) Appl. No.: 13/072,498

(22) Filed: Mar. 25, 2011

(65) Prior Publication Data
US 2012/0241157 A1 Sep. 27, 2012

(51) Int. Cl.
*C09K 8/80* (2006.01)
*C04B 35/10* (2006.01)
*C04B 35/18* (2006.01)

(52) U.S. Cl.
USPC ............ 501/127; 501/128; 501/141; 501/143; 501/144; 166/280.2

(58) Field of Classification Search
USPC ......... 501/127, 128, 141, 143, 144; 166/280.2
See application file for complete search history.

(56) References Cited

U.S. PATENT DOCUMENTS

| | | | |
|---|---|---|---|
| 4,427,068 A * | 1/1984 | Fitzgibbon | 166/280.2 |
| 4,440,866 A | 4/1984 | Lunghofer et al. | |
| 4,522,731 A | 6/1985 | Lunghofer | |
| 5,030,603 A * | 7/1991 | Rumpf et al. | 501/127 |
| 5,120,455 A | 6/1992 | Lunghofer | |
| 5,188,175 A | 2/1993 | Sweet | |
| 6,364,018 B1 * | 4/2002 | Brannon et al. | 166/280.2 |
| 6,372,678 B1 * | 4/2002 | Youngman et al. | 501/128 |
| 6,780,804 B2 * | 8/2004 | Webber et al. | 501/128 |
| 7,615,172 B2 | 11/2009 | Palamara et al. | |
| 7,678,723 B2 * | 3/2010 | Duenckel et al. | 501/127 |
| 2004/0040708 A1 * | 3/2004 | Stephenson et al. | 166/280.1 |
| 2006/0081371 A1 | 4/2006 | Duenckel et al. | |
| 2006/0162929 A1 | 7/2006 | Urbanek | |
| 2006/0219600 A1 | 10/2006 | Palamara et al. | |
| 2007/0084602 A1 | 4/2007 | Curimbaba et al. | |
| 2008/0135246 A1 * | 6/2008 | Canova et al. | 166/280.2 |
| 2008/0220996 A1 | 9/2008 | Duenckel et al. | |
| 2008/0241540 A1 * | 10/2008 | Canova et al. | 428/402 |
| 2009/0038797 A1 | 2/2009 | Skala et al. | |
| 2010/0059224 A1 | 3/2010 | Palamara et al. | |
| 2010/0126728 A1 | 5/2010 | Duenckel et al. | |

FOREIGN PATENT DOCUMENTS

CA 2444826 4/2004

OTHER PUBLICATIONS

International Search Report, mailed Jul. 24, 2012, by the ISA/US, regarding PCT/US2012/026105.
Written Opinion, mailed Jul. 24, 2012, by the ISA/US, regarding PCT/US2012/026105.

* cited by examiner

*Primary Examiner* — Karl Group
(74) *Attorney, Agent, or Firm* — Haynes and Boone, LLP (57) ABSTRACT

Sintered, substantially round and spherical particles and methods for producing such sintered, substantially round and spherical particles from an alumina-containing raw material and a metal oxide sintering aid. The alumina-containing raw material contains from about 40% to about 55% alumina. Methods for using such sintered, substantially round and spherical particles in hydraulic fracturing operations.

27 Claims, 1 Drawing Sheet

SINTERED PARTICLES AND METHODS FOR PRODUCING SINTERED PARTICLES FROM A SLURRY OF AN ALUMINA-CONTAINING RAW MATERIAL

BACKGROUND

The present invention relates to sintered, substantially round and spherical particles and methods for producing such sintered, substantially round and spherical particles from a slurry of an alumina-containing raw material. The methods described herein provide for nucleation and promotion of the growth of mullite crystals in the sintered particles, which in turn contributes strength to the sintered particles. The sintered particles are prepared from a slurry of a raw material having an alumina content of from about 40% to about 55% by weight, and a metal oxide sintering aid in an amount of from about 1% to about 6% of the dry weight of the total solids in the slurry. The sintered particles are suitable for use as a propping agent or as a foundry media.

Oil and natural gas are produced from wells that penetrate porous and permeable subterranean formations. The porosity of such a formation permits the formation to store oil and gas, and the permeability of such a formation permits the oil or gas to move through the formation. The permeability of such a formation is essential to permit oil and gas to flow to a location where it can be pumped from the well. Sometimes, however, the permeability of a formation is insufficient for the economic recovery of oil and gas. In other cases, during operation of the well, the permeability of a formation decreases to the extent that further recovery of oil and gas becomes uneconomical. In such cases, it is necessary to fracture the formation and prop the fracture in an open condition by means of a proppant material or propping agent. Such fracturing is usually accomplished by hydraulic pressure, and the proppant material or propping agent is a particulate material, such as sand, glass beads or ceramic particles, which are carried into the fracture by means of a fluid. The use of low density proppant has generally been limited to use in reservoirs with low to moderate closure stress (2000-7500 psi) due to the inherent lack of strength of low density proppant at higher closure stress relative to high density bauxite-based proppants. A lightweight proppant which has strength, long term conductivity and long term permeability equal to or greater than intermediate or high density proppants at closure pressures about 6000 psi would be beneficial.

The foundry industry has traditionally used inexpensive natural sands for casting. However, natural sands exhibit large thermal expansion characteristics, which means that the core boxes and molds must be highly pre-engineered to allow for the expansion of the sand when it comes in contact with the heat from the molten metal. Many times, despite pre-engineering efforts, expansion related defects occur resulting in scrapped parts or parts requiring high cleaning cost to correct. Also, natural sands contain crystalline quartz silica, which is a health and environmental hazard within the workplace. In addition, natural sands are mined, which results in product inconsistencies that lead to casting inconsistencies. Furthermore, most silica sands have a low degree of roundness and are somewhat friable resulting in low flowability and compaction, high breakdown and high solid waste emissions. Specialty sands, such as zircon and chromite, have low expansion properties but are very dense, making core handling more difficult and requiring more resin to obtain adequate tensile strengths. These products are mined and present concerns of availability, consistency and sizing flexibility. They also tend to be somewhat friable.

DETAILED DESCRIPTION

Figure 1:
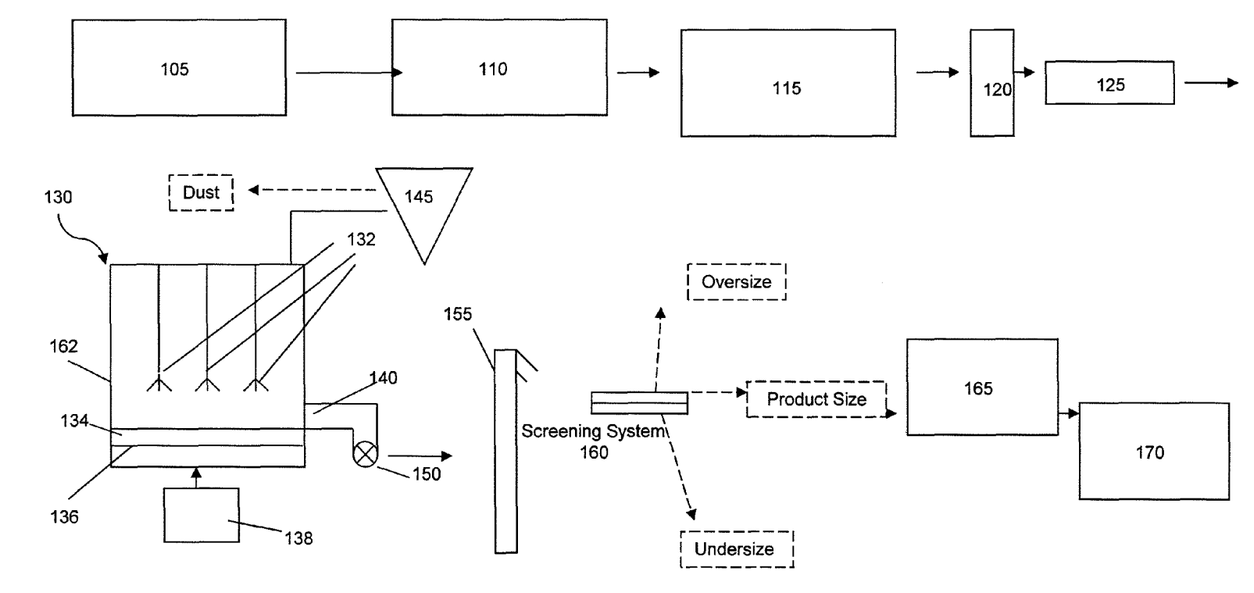
The FIGURE is a schematic illustration of a system for preparing substantially round and spherical particles from a slurry as described herein.

Described herein are sintered, substantially round and spherical particles and methods for preparing such sintered, substantially round and spherical particles from a slurry of an alumina containing raw material.

The term "substantially round and spherical" and related forms, as used herein, is defined to mean an average ratio of minimum diameter to maximum diameter of about 0.8 or greater, or having an average sphericity value of about 0.8 or greater compared to a Krumbein and Sloss chart.

The alumina-containing raw material may be a substantially homogenous raw material or a blend of raw materials (collectively referred to as "raw material" where appropriate). The alumina-containing raw material has an alumina content of about 40% to about 55% by weight (on a calcined basis). In certain embodiments, the alumina-containing raw material has an alumina content of about 41.5% to about 49% by weight (on a calcined basis). The alumina-containing raw material can be calcined, uncalcined, or partially calcined. Exemplary raw materials include but are not limited to certain kaolin clays, china clays, diaspore clays, ball clays, flint clays and mixtures thereof.

The term "uncalcined" and related forms, as used herein, refers to a raw material that contains a residual amount of naturally-occurring volatiles, for example, from about 10 to about 40 wt. %, which may include organic material and chemically bound water (also referred to as "water of hydration").

The term "calcined" and related forms, as used herein, refers to a raw material that has been treated at temperatures and times sufficient to remove organic material and to substantially remove water of hydration.

The sintered particles are prepared from a slurry of the alumina-containing raw material and a metal oxide sintering aid. Suitable metal oxide sintering aids include iron oxides (FeO, $Fe_2O_3$ and $Fe_3O_4$), magnesium oxide (MgO), manganese oxides (MnO, $Mn_2O_3$, $Mn_3O_4$ $MnO_2$ and $Mn_2O_7$), titanium oxides ($TiO_2$ and $Ti_2O_3$) and oxides of the Lanthanide Series of rare earth metals. According to certain embodiments, a sufficient amount of the metal oxide sintering aid is added to a substantially homogeneous raw material or a blend of raw materials to achieve a metal oxide content in an amount of from about 1% to about 6% based on the dry weight of the total solids in the slurry. In certain embodiments, the metal oxide sintering aid is added to the raw material to achieve a metal oxide content of from about 2% to about 6% based on the dry weight of the total solids in the slurry.

As described herein, sintered, substantially round and spherical particles are prepared from a slurry of alumina-containing raw material. In certain embodiments, the particles have an alumina content of from about 40% to about 55% by weight. In certain other embodiments, the sintered, substantially round and spherical particles have an alumina content of from about 41.5% to about 49% by weight.

In certain embodiments the sintered, substantially round and spherical particles have a metal oxide sintering aid content of from about 1% to about 6% by weight. In certain other embodiments, the sintered, substantially round and spherical particles have a metal oxide sintering aid content of from about 2% to about 6% by weight.

In certain embodiments, the sintered, substantially round and spherical particles have a ratio of alumina to silica of less than 1:1. In certain other embodiments, the sintered, substantially round and spherical particles have a ratio of alumina to silica of from about 0.8:1 to about 0.9:1.

In certain embodiments, the sintered, substantially round and spherical particles have a bulk density of from about 1.35 g/cm$^3$ to about 1.55 g/cm$^3$. The term "bulk density", as used herein, refers to the weight per unit volume, including in the volume considered, the void spaces between the particles. In certain other embodiments, the particles have a bulk density of from about 1.40 g/cm$^3$ to about 1.50 g/cm$^3$.

In certain embodiments, the sintered, substantially round and spherical particles have a crush strength at 10,000 psi of from about 5% to about 8.5%, and a long term conductivity at 10,000 psi of from about 2500 mD-ft to about 3000 mD-ft. In certain other embodiments, the sintered, substantially round and spherical particles have a crush strength at 10,000 psi of from about 5% to about 7.5%.

In certain embodiments, the sintered, substantially round and spherical particles have a long term permeability at 10,000 psi of more than 140 Darcies. In certain other embodiments, the sintered, substantially round and spherical particles have a long term permeability of from about 150 to about 175 Darcies. In still other embodiments, the sintered, substantially round and spherical particles have a Darcy Volume Factor at 10,000 psi of more than 110 Darcy-cm$^3$/g. In still further embodiments, the sintered, substantially round and spherical particles have a Darcy Volume Factor at 10,000 psi of from about 115 to about 125 Darcy-cm$^3$/g. The term "Darcy Volume Factor," as used herein, refers to a number that is determined by dividing the long term permeability in Darcies at 10,000 psi by the bulk density for a sample. The Darcy Volume Factor is a measure of the effectiveness of a proppant in terms of long term permeability in Darcies per unit volume of the proppant.

In still other embodiments, the sintered, substantially round and spherical particles have an apparent specific gravity of from about 2.50 to about 3.00. The term "apparent specific gravity," (ASG) as used herein, refers to a number without units that is defined to be numerically equal to the weight in grams per cubic centimeter of volume, including void space or open porosity in determining the volume.

According to other embodiments, the sintered, substantially round and spherical particles have a size of from about 20 to about 40 U.S. Mesh.

Generally, relatively smaller particles can be used as foundry media, while relatively larger particles can be used as propping agents. Regardless of size, however, the use of a sintering aid in the manufacture of the particles produces particles having a mullite content that enhances the strength of the particles as compared to particles made according to conventional methods. The methods described herein provide for nucleation and promotion of the growth of mullite crystals in the sintered particles, which in turn contributes strength to the sintered particles. Expansion of mullite is significantly lower than the expansion of cristobalite or corundum, thus, the thermal expansion property of a media as described herein could also be low enough for use as a foundry media.

The mullite content of sintered particles as described herein can be theoretically calculated based on the amount of alumina and silica in the particles. Generally, particles having an alumina content of about 60% by weight and a silica content of about 40% by weight would theoretically have about 100% mullite, although the actual mullite content, which can be determined by X-ray diffraction analysis, would be affected by the balance of oxides in the particles. It was generally assumed by those of ordinary skill in the art that an abundance of alumina over silica close to stoichiometric values would result in the formation of mullite to create a high performing light-weight proppant. Based on the prior art, it was unexpected and not obvious that an alumina to silica ratio far from the stoichiometric values needed for mullite formation would produce a lightweight proppant that performed as well as or better than materials with near stoichiometric alumina to silica values. The significance of this relationship between alumina and silica is that upon sintering, pellets made from a raw material having an alumina content of less than about 60% and a silica content of greater than about 40%, the tendency would be to form glass instead of mullite. Particles that contain increased levels of glass do not have sufficient strength and durability characteristics to function as proppant for long periods of time in high stress and high temperature hydrocarbon bearing reservoirs. So, it was quite surprising that an effective lightweight proppant material could be formed from a composition that includes an alumina-containing raw material that includes from about 40% to about 55% by weight of alumina and from about 1% to about 6% of a metal oxide sintering aid based on the combined dry weight of the alumina-containing raw material and the metal oxide sintering aid.

In exemplary embodiments, the composition from which the sintered, substantially round and spherical particles are formed, includes from about 40% to about 55% alumina, from about 40% to about 55% silica, from about 1% to about 6% of a metal oxide sintering aid and a balance of oxides such as potassium oxide, calcium oxide, titanium dioxide, magnesium oxide and sodium oxide which produces a media that has a mullite content above 70%. In certain embodiments, the ratio of alumina to silica in the sintered, substantially round and spherical particles is less than 1:1. In certain other embodiments, the ratio of alumina to silica in the sintered, substantially round and spherical particles is from about 0.8:1 to about 0.9:1.

According to certain embodiments described herein, the sintered, substantially round and spherical particles are made in a continuous process, while in other embodiments, the particles are made in a batch process.

Referring now to the FIGURE, an exemplary system for implementing a continuous process for preparing sintered, substantially round and spherical particles from a slurry is illustrated. The exemplary system illustrated in the FIGURE is similar in configuration and operation to that described in U.S. Pat. No. 4,440,866, the entire disclosure of which is hereby incorporated by reference herein. The operations performed by the exemplary system illustrated in the FIGURE can also be used to make the particles according to a batch process, as described in Example 1 below.

In the system illustrated in the FIGURE, an alumina-containing raw material having an alumina content of from about 40% to about 55% by weight (on a calcined basis) is passed through a shredder 105 which slices and breaks apart the raw material into small chunks. In some embodiments, when the raw material as mined, or as received, (referred to herein as "untreated" raw material) is of such consistency that it can be processed as described herein without shredding, the shredder may be bypassed.

Raw material fed through a shredder such as is illustrated in the FIGURE, is referred to as "treated" raw material. The raw material may have a natural content of a metal oxide sintering aid of up to about 1% dry weight of the total solids. Consequently, additional amounts of the metal oxide sintering aid may be added to the raw material to result in a higher concentration of the metal oxide sintering aid up to about 6% based on the dry weight of the total solids in the slurry. According to one embodiment, the metal oxide sintering aid is added to the raw material after it has been shredded, for example, in a subsequent blunging or mixing step as will be discussed further herein.

In certain embodiments, the shredder breaks apart and slices the alumina-containing raw material so as to yield pieces having a diameter of less than about five inches, although pieces having smaller and larger diameters can be further processed into a slurry as described herein. Shredders and numerous other devices for slicing, chopping or comminuting the alumina-containing raw material, as well as commercial sources for same, such as the Gleason Foundry Company, are well known to those of ordinary skill in the art.

The treated or untreated alumina-containing raw material and water are fed to a blunger 110, which has a rotating blade that imparts a shear force to and further reduces the particle size of the raw material to form a slurry. In a continuous process, the raw material and water are continuously fed to the blunger. Blungers and similar devices for making slurries of such materials, as well as commercial sources for same are well known to those of ordinary skill in the art.

In certain embodiments, the metal oxide sintering aid is added to the alumina-containing raw material and water in the blunger or just prior to the formation of pellets as described below.

A sufficient amount of water is added to the blunger 110 to result in a slurry having a solids content in the range of from about 40% to about 60% by weight. In certain embodiments, a sufficient amount of water is added to the slurry such that the solids content of the slurry is from about 45% to about 55% by weight. In still other embodiments, a sufficient amount of water is added to the slurry such that the solids content of the slurry is about 50% by weight. The water added to the blunger can be fresh water or deionized water. In a continuous process for preparing the slurry, the solids content of the slurry is periodically analyzed and the amount of water fed to the slurry adjusted to maintain the desired solids content. Methods for analyzing the solids content of a slurry and adjusting a feed of water are well known and understood by those of ordinary skill in the art.

In certain embodiments, a dispersant is added to the slurry in the blunger to adjust the viscosity of the slurry to a target range as discussed further below. In other embodiments, the viscosity of the slurry in the blunger is adjusted to the target range by the addition of a dispersant and a pH-adjusting reagent.

A dispersant may be added to the slurry prior to the addition of the metal oxide sintering aid, if any, or other additives. In certain embodiments, the composition includes a dispersant in an amount of from about 0.15% to about 0.30% by weight based on the dry weight of the alumina-containing raw material.

Exemplary materials suitable for use as a dispersant in the compositions and methods described herein include but are not limited to sodium polyacrylate, ammonium polyacrylate, ammonium polymethacrylate, tetra sodium pyrophosphate, tetra potassium pyrophosphate, polyphosphate, ammonium polyphosphate, ammonium citrate, ferric ammonium citrate, and polyelectrolytes such as a composition of ammonium polymethacrylate and water commercially available from a variety of sources, such as, Kemira Chemicals under the trade name C-211, Phoenix Chemicals, Bulk Chemical Systems under the trade name BCS 4020 and R.T. Vanderbilt Company, Inc. under the trade name DARVAN C. Generally, the dispersant can be any material that will adjust the viscosity of the slurry to a target viscosity such that the slurry can be subsequently processed through one or more pressure nozzles of a fluidizer. In certain embodiments, the target viscosity is less than 150 centipoises (cps) (as determined on a Brookfield Viscometer with a #61 spindle). In other embodiments, the target viscosity is less than 100 cps.

According to embodiments in which a pH-adjusting reagent is used, a sufficient amount of a pH-adjusting reagent is added to the slurry to adjust the pH of the slurry to a range of from about 8 to about 11. In certain embodiments, a sufficient amount of the pH-adjusting reagent is added to the slurry to adjust the pH to about 9, about 9.5, about 10 or about 10.5. The pH of the slurry can be periodically analyzed by a pH meter, and the amount of pH-adjusting reagent fed to the slurry adjusted to maintain a desired pH. Methods for analyzing the pH of a slurry and adjusting the feed of the pH-adjusting reagent are within the ability of those of ordinary skill in the art. Exemplary materials suitable for use as a pH-adjusting reagent in the compositions and methods described herein include but are not limited to ammonia and sodium carbonate.

Generally, the target viscosity of the compositions is a viscosity that can be processed through a given type and size of pressure nozzle in a fluidizer, without becoming clogged. Generally, the lower the viscosity of the slurry, the more easily it can be processed through a given fluidizer. However, the addition of too much dispersant can cause the viscosity of the slurry to increase to a point that it cannot be satisfactorily processed through a given fluidizer. One of ordinary skill in the art can determine the target viscosity for given fluidizer types through routine experimentation.

The blunger 110 mixes the alumina-containing raw material, metal oxide sintering aid, water, dispersant and pH-adjusting reagent until a slurry is formed. The length of time required to form a slurry is dependent on factors such as the size of the blunger, the speed at which the blunger is operating, and the amount of material in the blunger.

From the blunger 110, the slurry is fed to a tank 115, where the slurry is continuously stirred, and a binder is added in an amount of from about 0.2% to about 5.0% by weight, based on the total dry weight of the alumina-containing raw material and the metal oxide sintering aid. In certain embodiments, the binder is added in an amount of from about 0.2% to about 3.0% by weight based on the total dry weight of the alumina-containing raw material and the metal oxide sintering aid. Suitable binders include but are not limited to polyvinyl acetate, polyvinyl alcohol (PVA), methylcellulose, dextrin and molasses. In certain embodiments, the binder is PVA having a molecular weight of from about 20,000 to 100,000 Mn. "Mn" represents the number average molecular weight which is the total weight of the polymeric molecules in a sample, divided by the total number of polymeric molecules in that sample.

The tank 115 maintains the slurry created by the blunger 110. However, the tank 115 stirs the slurry with less agitation than the blunger, so as to mix the binder with the slurry without causing excessive foaming of the slurry or increasing the viscosity of the slurry to an extent that would prevent the slurry from being fed through the pressurized nozzles of a fluidizer.

In another embodiment, the binder can be added to the slurry while in the blunger. In this embodiment, the blunger optionally has variable speeds, including a high speed to achieve the high intensity mixing for breaking down the raw material into a slurry form, and a low speed to mix the binder with the slurry without causing the above-mentioned excessive foaming or increase in viscosity.

Referring again to the tank 115 illustrated in the FIGURE, the slurry is stirred in the tank, after addition of the binder, for a time sufficient to thoroughly mix the binder with the slurry. In certain embodiments, the slurry is stirred in the tank for up to about 30 minutes following the addition of binder. In other embodiments, the slurry is stirred in the tank 115 for at least about 30 minutes. In still other embodiments, the slurry is stirred in the tank for more than about 30 minutes after addition of the binder.

Tank 115 can also be a tank system comprised of one, two, three or more tanks. Any configuration or number of tanks that enables the thorough mixing of the binder with the slurry is sufficient. In a continuous process, water, and one or more of dust, oversize particles, or undersize particles from a subsequent fluidizer or other apparatus can be added to the slurry in the tank 115.

From the tank 115, the slurry is fed to a heat exchanger 120, which heats the slurry to a temperature of from about 25° C. to about 90° C. From the heat exchanger 120, the slurry is fed to a pump system 125, which feeds the slurry, under pressure, to a fluidizer 130.

A grinding mill(s) and/or a screening system(s) (not illustrated) can be inserted at one or more places in the system illustrated in the FIGURE prior to feeding the slurry to the fluidizer to assist in breaking any larger-sized alumina-containing raw material down to a target size suitable for feeding to the fluidizer. In certain embodiments, the target size is less than 230 mesh. In other embodiments, the target size is less than 325 mesh, less than 270 mesh, less than 200 mesh or less than 170 mesh. The target size is influenced by the ability of the type and/or size of the pressure nozzle in the subsequent fluidizer to atomize the slurry without becoming clogged.

If a grinding system is employed, it is charged with a grinding media suitable to assist in breaking the raw material down to a target size suitable for subsequent feeding through one or more pressure nozzles of a fluidizer. If a screening system is employed, the screening system is designed to remove particles larger than the target size from the slurry. For example, the screening system can include one or more screens, which are selected and positioned so as to screen the slurry to particles that are smaller than the target size.

Referring again to the FIGURE, fluidizer 130 is of conventional design, such as described in, for example, U.S. Pat. No. 3,533,829 and U.K. Patent No. 1,401,303. Fluidizer 130 includes at least one atomizing nozzle 132 (three atomizing nozzles 132 being shown in the FIGURE), which is a pressure nozzle of conventional design. In other embodiments, one or more two-fluid nozzles are suitable. The design of such nozzles is well known, for example from K. Masters: "Spray Drying Handbook", John Wiley and Sons, New York (1979).

Fluidizer 130 further includes a particle bed 134, which is supported by a plate 136, such as a perforated, straight or directional plate. Hot air flows through the plate 136. The particle bed 134 comprises seeds from which green pellets of a target size can be grown. The term "green pellets" and related forms, as used herein, refers to substantially round and spherical particles which have been formed from the slurry but are not sintered. When a perforated or straight plate is used, the seeds also serve to obtain plug flow in the fluidizer. Plug flow is a term known to those of ordinary skill in the art, and can generally be described as a flow pattern where very little back mixing occurs. The seed particles are smaller than the target size for green pellets made according to the present methods. In certain embodiments, the seed comprises from about 5% to about 20% of the total volume of a green pellet formed therefrom. Slurry is sprayed, under pressure, through the atomizing nozzle 132, and the slurry spray coats the seeds to form green pellets that are substantially round and spherical.

External seeds can be placed on the perforated plate 136 before atomization of the slurry by the fluidizer begins. If external seeds are used, the seeds can be prepared in a slurry process similar to that illustrated in the FIGURE, where the seeds are simply taken from the fluidizer at a target seed size. External seeds can also be prepared in a high intensity mixing process such as that described in U.S. Pat. No. 4,879,181, the entire disclosure of which is hereby incorporated by reference.

According to certain embodiments, external seeds are made from either a raw material having at least the same alumina content as the raw material used to make the slurry, or from a raw material having more or less alumina than the raw material used to make the slurry. In certain embodiments, the slurry has an alumina content that is at least 10%, at least 20%, or at least 30% less than that of the seeds. In other embodiments, the external seeds have an alumina content less than that of the slurry, such as at least 10%, at least 20%, or at least 30% less than that of the slurry.

Alternatively, seeds for the particle bed are formed by the atomization of the slurry, thereby providing a method by which the slurry "self-germinates" with its own seed. According to one such embodiment, the slurry is fed through the fluidizer 130 in the absence of a seeded particle bed 134. The slurry droplets exiting the nozzles 132 solidify, but are small enough initially that they get carried out of the fluidizer 130 by air flow and caught as "dust" (fine particles) by a dust collector 145, which may, for instance, be an electrostatic precipitator, a cyclone, a bag filter, a wet scrubber or a combination thereof. The dust from the dust collector is then fed to the particle bed 134 through dust inlet 162, where it is sprayed with slurry exiting the nozzles 132. The dust may be recycled a sufficient number of times, until it has grown to a point where it is too large to be carried out by the air flow and can serve as seed. The dust can also be recycled to another operation in the process, for example, the tank 115.

Referring again to the FIGURE, hot air is introduced to the fluidizer 130 by means of a fan and an air heater, which are schematically represented at 138. The velocity of the hot air passing through the particle bed 134 is from about 0.9 meters/second to about 1.5 meters/second, and the depth of the particle bed 134 is from about 2 centimeters to about 60 centimeters. The temperature of the hot air when introduced to the fluidizer 130 is from about 250° C. to about 650° C. The temperature of the hot air as it exits from the fluidizer 130 is less than about 250° C., and in some embodiments is less than about 100° C.

The distance between the atomizing nozzles 132 and the plate 136 is optimized to avoid the formation of dust which occurs when the nozzles 132 are too far away from the plate 126 and the formation of irregular, coarse particles which occurs when the nozzles 132 are too close to the plate 136. The position of the nozzles 132 with respect to the plate 136 is adjusted on the basis of an analysis of powder sampled from the fluidizer 130.

The green pellets formed by the fluidizer accumulate in the particle bed 134. In a continuous process, the green pellets formed by the fluidizer 130 are withdrawn through an outlet 140 in response to the level of product in the particle bed 134 in the fluidizer 130, so as to maintain a given depth in the particle bed. A rotary valve 150 conducts green pellets withdrawn from the fluidizer 130 to an elevator 155, which feeds the green pellets to a screening system 160, where the green pellets are separated into one or more fractions, for example, an oversize fraction, a product fraction, and an undersize fraction.

The oversize fraction exiting the screening unit 160 includes those green pellets that are larger than the desired product size. In a continuous process, the oversize green pellets may be recycled to tank 115, where at least some of the oversize green pellets can be broken down and blended with slurry in the tank. Alternatively, oversize green pellets can be broken down and recycled to the particle bed 134 in the fluidizer 130. The undersize fraction exiting the screening system 160 includes those green pellets that are smaller than the desired product size. In a continuous process, these green pellets may be recycled to the fluidizer 130, where they can be fed through an inlet 162 as seeds or as a secondary feed to the fluidizer 130.

The product fraction exiting the screening system 160 includes those green pellets having the desired product size. These green pellets are sent to a pre-sintering device 165, for example, a calciner, where the green pellets are dried or calcined prior to sintering. In certain embodiments, the green pellets are dried to a moisture content of less than about 18% by weight, or less than about 15% by weight, about 12% by weight, about 10% by weight, about 5% by weight, or about 1% by weight.

After drying and/or calcining, the green pellets are fed to a sintering device 170, in which the green pellets are sintered for a period of time sufficient to enable recovery of sintered, substantially round and spherical particles having one or more of a desired apparent specific gravity, bulk density, and crush strength. Alternatively, the pre-sintering device 165 can eliminated if the sintering device 170 can provide sufficient calcining and/or drying conditions (i.e., drying times and temperatures that dry the green pellets to a target moisture content prior to sintering), followed by sufficient sintering conditions.

The specific time and temperature to be employed for sintering is dependent on the starting ingredients and the desired density for the sintered particles. In some embodiments, sintering device 170 is a rotary kiln, operating at a temperature of from about 1000° C. to about 1600° C., for a period of time of from about 5 to about 90 minutes. In certain embodiments, a rotary kiln is operated at a temperature of about 1000° C., about 1200° C., about 1300° C., about 1400° C. or about 1500° C. In certain embodiments, the green pellets have a residence time in the sintering device of from about 50 minutes to about 70 minutes, or from about 30 minutes to about 45 minutes. After the particles exit the sintering device 170, they can be further screened for size, and tested for quality control purposes.

The following examples illustrate batch processes for preparing sintered, substantially round and spherical particles from a slurry of an alumina-containing raw material and a metal oxide sintering aid in a manner similar to the system described above and illustrated in the FIGURE.

EXAMPLE 1

Generally according to a batch-wise example of the continuous method described above, Slurry Nos. 1-3 were prepared for this Example 1.

Each of the slurries was prepared from a raw material comprising an uncalcined kaolin having the chemistry reported in Table 1 below. The chemical analysis of the kaolin raw material was determined by inductively coupled plasma (ICP). Generally, a sample of the kaolin raw material was prepared for ICP analysis by first drying the material at about 100° C. to drive off water. The dried sample was then ground and heated to about 1000° C. to drive off chemically bound water and other compounds. The dried sample was then mixed with nitric acid and the ICP analysis was conducted according to methods known to those of ordinary skill in the art.

TABLE 1

| ICP Chemistry (wt. %) of Raw Material for Slurries | | | | | | | | |
|---|---|---|---|---|---|---|---|---|
| $Al_2O_3$ | $SiO_2$ | $K_2O$ | CaO | $TiO_2$ | $Fe_2O_3$ | MgO | $Na_2O$ | $P_2O_5$ |
| 48.25 | 48.45 | 0.075 | 0.005 | 2.08 | 0.93 | 0.032 | 0.061 | 0.123 |

Slurries of the raw material were prepared by mixing the raw material with water, a dispersant, and a pH-adjusting reagent in a lab blunger, which simulates blunger 110. Suitable lab blungers are known to those of ordinary skill in the art and are readily available from a variety of commercial sources, such as MorehouseCowles. Suitable lab blungers can also be simply made from a tank with baffles and a mixer for breaking down the raw material.

Iron oxide in the amount reported in Table 2 below, which is based on a dry weight percent of total solids in the slurry, was added to the lab blunger. The iron oxide was APC901 which is commercially available from Alabama Pigments Company, of McCalla, Ala. The APC901 iron oxide was obtained as a finely ground material containing about 72% iron oxide and having a particle size of between 1 micron and 75 microns with an average size of generally 44 microns or less.

Water was added in an amount sufficient to achieve and maintain a solids content in the range of 40% to 60% by weight. In this Example 1, a sufficient amount of water was added to achieve a targeted solids content of about 50%. The measured solids content of each slurry in this Example 1 is reported in Table 2 and was determined just prior to the slurry being fed to a subsequent fluidizer, however, the solids content of the slurry is tested periodically throughout this batch process to ensure that the targeted solids content is being achieved and maintained. The solids contents reported in Table 2 were determined by an Ohaus Model MB 35 moisture balance scale.

Ammonium polyacrylate was added as the dispersant in an amount of about 0.15 to 0.30% by weight based on the dry weight of the raw material and iron oxide. The viscosity values reported in Table 2 were determined just prior to the slurry being fed to a subsequent fluidizer. However, the viscosity is tested periodically throughout this batch process to ensure that the slurry has a viscosity that can be fed through a subsequent fluidizer. The viscosity reported in Table 2 was determined with a Brookfield viscometer with a number 61 spindle, which is commercially available from Brookfield Engineering Laboratories, Middleboro, Mass.

Ammonia in the form of aqua ammonia was added to the slurry as the pH-adjusting reagent to achieve a pH in the range of about 8 to about 11. Aqua ammonia is widely commercially available from suppliers such as Airgas Specialty Products, Tanner Industries, Inc., Continental Chemical USA and The Stutz Company. The pH of each slurry is reported in Table 2. The pH reported in Table 2 was determined just prior to the slurry being fed to a subsequent fluidizer, however, the pH of the slurry is tested periodically throughout this batch process with a ThermoOrion Model 420 bench top pH meter to ensure that the targeted pH range is being achieved. The pH of the slurry was determined just prior to fluidizing with a double junction water-proof pH tester which is commercially available from VWR International LLC, Radnor, Pa.

The slurry, which comprised water, kaolin, iron oxide, dispersant and pH-adjusting reagent, was mixed in a lab blunger such as a 10 horsepower model 10 MorehouseCowles dissolver for about 30 minutes, and then screened through a round, vibratory screen separator which is available from a variety of commercial sources, such as Sweco Separator Co.

After screening to about 200 mesh, the slurry was transported to a barrel fitted with a low speed agitator, which stirred the slurry as a simulation of tank 115. Lab tanks and similar devices for simulating tank 115 are readily available from a variety of commercial sources, such as Applied Chemical Technology and O'Connor Kiln & Dryer. Suitable devices have a low speed agitator capable of stirring the slurry without causing excessive foaming or increasing the viscosity of the slurry. A polyvinyl alcohol (PVA) co-polymer was added to the slurry as a binder in an amount of about 0.70% of the total dry weight of the kaolin raw material and the iron oxide. PVA is widely commercially available from suppliers such as DuPont and Air Products as a dry powder that can be solubilized by dissolving it in hot water according to methods known to those of ordinary skill in the art or with routine experimentation. After the binder was added to the slurry, it was stirred in the barrel for about 30 minutes.

The chemical analysis of Slurry Nos. 2 and 3 was determined by inductively coupled plasma (ICP). The results of the ICP analysis are reported in Table 2, where "n/a" indicates that the property was not evaluated.

TABLE 2

Properties of Slurries Used in Fluidizer to Produce Sample Nos. 1, 2 and 3

|  | Slurry No. 1 | Slurry No. 2 | Slurry No. 3 |
|---|---|---|---|
| Slurry Components |  |  |  |
| Raw Material (wt. %) | 100 | 99 | 98 |
| Added $Fe_2O_3$ (wt. %) | 0 | 1 | 2 |
| Slurry Properties |  |  |  |
| % Moisture | — | — | — |
| LOI before ICP | — | — | — |
| Solids (wt. %) | 50.6 | 50.6 | 50.7 |
| pH | 9.6 | 9.6 | 9.6 |
| Viscosity @ 60 rpm (cps) | 48 | 50 | 50 |
| Slurry ICP Chemistry (wt. %) |  |  |  |
| $Al_2O_3$ | 48.25 | 47.76 | 47.36 |
| $SiO_2$ | 48.45 | 48.20 | 47.92 |
| $K_2O$ | 0.075 | 0.093 | 0.097 |
| CaO | 0.005 | 0.020 | 0.031 |
| $TiO_2$ | 2.08 | 2.06 | 2.04 |
| $Fe_2O_3$ | 0.93 | 1.62 | 2.31 |
| MgO | 0.032 | 0.039 | 0.044 |
| $Na_2O$ | 0.061 | 0.085 | 0.065 |
| $P_2O_5$ | 0.123 | 0.131 | 0.131 |

The slurry was fed to a trial fluidizer, which simulated the heat exchanger, fluidizer, pump, dust collector, air heater and fan described above with respect to the FIGURE. Trial or pilot fluidizers are commercially available from a variety of sources such as Applied Chemical Technology.

The particle bed in the trial fluidizer was populated with external seeds having the properties reported in Table 3 below which were obtained from a slurry production process for producing ceramic pellets.

TABLE 3

ICP Chemistry and Size Distribution of External Seeds Used in Pilot Trials

| ICP Chemistry | | Size Distribution | |
|---|---|---|---|
|  | % |  | % retained on |
| $Al_2O_3$ | 48.100 | 20 mesh | 0.00 |
| $SiO_2$ | 48.400 | 30 mesh | 4.30 |
| $K_2O$ | 0.075 | 35 mesh | 47.90 |
| CaO | 0.012 | 40 mesh | 29.30 |
| $TiO_2$ | 2.290 | 45 mesh | 15.90 |
| $Fe_2O_3$ | 1.000 | 50 mesh | 2.00 |
| MgO | 0.038 | 70 mesh | 0.50 |
| $Na_2O$ | 0.035 | pan | 0.10 |
| $P_2O_5$ | 0.058 |  |  |

The slurry was fed through the trial fluidizer for a period of about 1.5 to about 2 hours. The heat exchanger heated the slurry so that the slurry was fed to the pressure nozzle of the fluidizer at an average temperature (over the 2 hour period) as reported below in Table 4. The pressure and temperature at which the slurry was pumped by a high pressure positive displacement pump, the temperatures of the hot air incoming to and exiting from the fluidizer, and other conditions of the fluidizer are also reported in Table 4.

TABLE 4

Average Fluidizer Conditions to Produce Samples Nos. 1, 2 and 3

| Slurry Feed Pressure (psi) | Slurry Feed Temp | Hot Air Inlet Temp | Hot Air Exhaust Temp | Bed Temp | Perforated Plate $\Delta P$ |
|---|---|---|---|---|---|
| 400-500 psi | 150-160° F. 65-71° C. | 350-500° F. 176-260° C. | 150-170° F. 65-77° C. | 170-190° F. 77-88° C. | 4.0-5.0 |

The velocity of the hot air passing through the particle bed was controlled based on a visual observation of the particles in the fluidizer, so as to allow the particles to remain in the particle bed, and not be entrained in the air stream.

When the particles in the fluidizer became substantially round and spherical, and approximately the target size, the air flow and the slurry feed to the fluidizer was stopped and the particles were removed and placed in storage containers.

A sample of the particles formed in the fluidizer was taken in order to conduct ICP chemical analysis, which was conducted according to methods known to those of ordinary skill in the art, which are generally described above. The results of the ICP analysis are reported below in Table 5 where "Sample No." indicates particles made from the correspondingly numbered Slurry, and "n/a" indicates that the property was not evaluated.

TABLE 5

Properties of lab Fired Green Pellets Formed in Fluidizer

|  | Sample No. 1 | Sample No. 2 | Sample No. 3 |
| --- | --- | --- | --- |
| % Moisture | — | — | — |
| LOI before ICP | — | — | — |
| ICP Chemistry (wt. %) |  |  |  |
| $Al_2O_3$ | 48.25 | 47.76 | 47.36 |
| $SiO_2$ | 48.45 | 48.20 | 47.92 |
| $K_2O$ | 0.075 | 0.093 | 0.097 |
| CaO | 0.005 | 0.020 | 0.031 |
| $TiO_2$ | 2.08 | 2.06 | 2.04 |
| $Fe_2O_3$ | 0.93 | 1.62 | 2.31 |
| MgO | 0.032 | 0.039 | 0.044 |
| $Na_2O$ | 0.061 | 0.085 | 0.065 |
| $P_2O_5$ | 0.123 | 0.131 | 0.131 |

Portions of each of the particles from the fluidizer (Sample Nos. 1, 2 and 3), were sintered in a laboratory static furnace at a temperature of about 1400° C. as reported below in Table 6. Laboratory static furnaces are commercially available from a variety of sources, such as CM Furnaces, Inc.

The sintered particles were screened to a U.S. Mesh size as reported in Table 6, which indicates that more 90% of the particles fell between 20 and 30 U.S. mesh. Thus, the size of the particles would be labeled as 20/40 according to API Recommended Practices RP60, Second Edition, December 1995, for testing proppants. Also as reported in Table 6, bulk density (BD), apparent specific gravity (ASG), crush, long term permeability and long term conductivity evaluations were conducted on samples of the screened sintered particles. Bulk density, ASG, crush and long term conductivity of samples of CARBOLite® and CARBOProp® proppant which are commercially available from CARBO Ceramics, Inc., which were screened to a U.S. Mesh size corresponding to that reported in Table 6, were also evaluated. The results of these evaluations are also reported below in Table 6, where "Sample No." indicates screened sintered particles made from the correspondingly numbered Slurry.

TABLE 6

Properties of Sintered Particles

|  | Sample No. 1 | Sample No. 2 | Sample No. 3 | CARBOLite® 20/40 | CARBOProp® 20/40 |
| --- | --- | --- | --- | --- | --- |
| Sintering Temp (° C.) | 1450-1500° C. | 1450-1500° C. | 1450-1500° C. | — | — |
| Screened to Size (U.S. Mesh) |  |  |  |  |  |
| 18 | 0.0 | n/a | 0.0 | — | — |
| 20 | 5.8 | n/a | 5.8 | — | — |
| 25 | 52.3 | n/a | 52.3 | — | — |
| 30 | 39.6 | n/a | 39.6 | — | — |
| 35 | 2.2 | n/a | 2.2 | — | — |
| 40 | 0.0 | n/a | 0.0 | — | — |
| Pan | 0.0 | n/a | 0.0 | — | — |
| Sample Properties |  |  |  |  |  |
| BD (g/cm$^3$) | 1.44 | 1.43 | 1.43 | 1.57 | 1.88 |
| ASG | 2.71 | n/a | 2.7 | 2.71 | 3.27 |
| Crush at 10K psi | 8.55 | 7.6 | 7.0 | 8.3 | 2.2 |
| Conductivity (mD-ft) at |  |  |  |  |  |
| 2000 psi | 9094 | n/a | 10372 | 10700 | 6180 |
| 4000 psi | 7153 | n/a | 7799 | 8900 | 5430 |
| 6000 psi | 5314 | n/a | 6058 | 6000 | 4450 |
| 8000 psi | 3726 | n/a | 4410 | 3700 | 3720 |
| 10000 psi | 2250 | n/a | 2898 | 2000 | 2890 |
| 12000 psi | 1186 | n/a | 1820 | — | 2145 |
| Permeability (D) at |  |  |  |  |  |
| 2000 psi | 469 | n/a | 535 | 570 | 385 |
| 4000 psi | 376 | n/a | 409 | 480 | 345 |
| 6000 psi | 286 | n/a | 326 | 340 | 290 |
| 8000 psi | 208 | n/a | 245 | 210 | 250 |
| 10000 psi | 131 | n/a | 167 | 120 | 200 |
| 12000 psi | 72 | n/a | 108 | — | 150 |
| Darcy Volume Factor at 10000 psi (Darcy-cm$^3$/g) | 91 | n/a | 117 | 76 | 106 |

TABLE 6-continued

Properties of Sintered Particles

| | Sample No. 1 | Sample No. 2 | Sample No. 3 | CARBOLite® 20/40 | CARBOProp® 20/40 |
|---|---|---|---|---|---|

The ASG and crush strength were determined using API Recommended Practices RP60, Second Edition, December 1995, for testing proppants. The crush strength is that percentage of the sample that was reduced to fines at 10,000 psi as reported in Table 6. For the samples reported in Table 6, fines are particles having a size of less than 40 U.S. mesh.

The BD was determined by following ANSI Test method B74.4-1992 (R2002).

Long term conductivity was determined according to API Recommended Practices RP61. These texts are known and readily available to those of ordinary skill in the art.

The properties reported in Table 6 demonstrate that sintered, substantially round and spherical particles prepared from a slurry of an alumina-containing raw material and a metal oxide sintering aid according to the methods described herein have sufficient bulk densities, crush strengths, long term conductivities and long term permeabilities for use in propping a fracture in a formation. In particular, Sample No. 3 had better crush strength, as well as better long term conductivity at 6000 psi and greater, while having a lower bulk density, as compared to that of the CARBOLite® proppant sample. Sample No. 3 also had better crush strength, as well as better long term conductivity at all levels as compared to that of Sample No. 1. Sample No. 2 had a better crush strength and a lower bulk density as compared to that of the CARBOLite® proppant sample. In addition, Sample No. 3 had a significantly increased Darcy Volume Factor which is a measure of the effectiveness of a proppant in terms of long term permeability in Darcies per unit volume of the proppant, compared to CARBOLite® and CARBOProp® proppant. The higher the Darcy Volume Factor the more efficient the proppant. The unique properties of Sample Nos. 2 and 3 are likely the result, at least in part, of an increased mullite content caused by the sintering aid.

EXAMPLE 2

Generally according to a batch-wise example of the continuous method described above, slurries were prepared so as to result in sintered particles having various amounts of alumina and iron oxide as indicated in Table 7 below for this Example 2.

Each of the slurries was prepared from a raw material comprising an uncalcined kaolin having the chemistry reported in Table 1 above and blended with other naturally occurring kaolinitic clay minerals such as kaolin, ball clay and flint clay that are typically available in Alabama, Georgia and Kentucky, USA to result in the various amounts of alumina in the sintered particles as indicated in Table 7. In addition, the iron oxide in the amount reported in Table 7 below, which is based on a dry weight percent of total solids in the slurry, was added to the lab blunger. As in Example 1, the iron oxide was APC901 which is commercially available from Alabama Pigments Company, of McCalla, Ala.

Samples of the sintered particles resulting from each of the slurries were analyzed for alumina content, bulk density (BD), apparent specific gravity (ASG) and crush at 10,000 psi as reported in Table 7. The bulk density, ASG and crush measurements were determined using the same procedures as described in Example 1.

TABLE 7

Properties of Sintered Particles

| | % $Fe_2O_3$ | | | | |
|---|---|---|---|---|---|
| % $Al_2O_3$ | 1.00% | 3.00% | 6.00% | 9.00% | 12.00% |
| | Bulk Density | | | | |
| 48.68 | 1.43 | 1.46 | | | |
| 48.17 | 1.43 | 1.46 | 1.49 | | |
| 45.65 | 1.42 | 1.43 | 1.49 | 1.46 | |
| 42.87 | 1.40 | 1.40 | 1.44 | 1.39 | |
| 41.67 | 1.38 | 1.36 | 1.39 | 1.42 | 1.49 |
| | Apparent Specific Gravity (ASG) | | | | |
| 48.68 | 2.68 | 2.75 | | | |
| 48.17 | 2.7 | 2.74 | 2.79 | | |
| 45.65 | 2.69 | 2.69 | 2.76 | 2.75 | |
| 42.87 | 2.62 | 2.63 | 2.69 | 2.76 | |
| 41.67 | 2.59 | 2.59 | 2.63 | 2.72 | |
| 40.00 | | | | | 2.82 |
| | Crush at 10K psi | | | | |
| 48.68 | 6.8 | 5.7 | | | |
| 48.17 | 6.8 | 5.0 | 5.5 | | |
| 45.65 | 6.7 | 5.5 | 5.3 | 7.1 | |
| 42.87 | 6.9 | 5.5 | 5.2 | 7.2 | |
| 41.67 | 8.6 | 6.5 | 6.0 | 7.2 | 7.3 |
| 40.00 | | | | | 7.1 |

Several trends can be seen from the data in Table 7. First, the presence of 1%, 3%, and 6% iron oxide content by weight significantly improves the crush strength of sintered particles having an alumina content from about 41.5% to about 49% by weight. However, below an alumina content of 41.5%, the corresponding crush strength is reduced significantly as compared to the higher alumina-content particles. Second, the crush strength improve significantly with the presence of 3% and 6% iron oxide content by weight, as compared to the presence of 1% iron oxide content by weight, which is representative of iron oxide levels naturally occurring in the kaolin raw material. However, the crush strength values worsen with the presence of 9% and 12% iron oxide content by weight.

The properties reported in Table 7 demonstrate that low doses of iron oxide, from about 1% to about 6% by weight, included in the slurries prepared according to the methods described herein generate sintered particles more suitable for use as proppants than those sintered particles generated from slurries without iron oxide, and those generated from slurries containing higher doses of iron oxide, such as 9 or 12% by weight. The sintered, substantially round and spherical particles prepared with iron oxide in concentrations of from about 1% to about 6% by weight have a sufficient bulk density, ASG and crush strength for use as lightweight proppant. In particular, the sintered particles analyzed in Example 2, as illustrated in Table 7, all had better crush strength, while having a lower bulk density, as compared to that of the CAR- BOLite® proppant sample discussed in Table 6. The unique properties of these sintered particles are likely the result at least in part of the amount of mullite generated by the specific weight ranges of the metal oxide sintering aid.

When used as a proppant, the particles described herein may be handled in the same manner as conventional proppants. For example, the particles may be delivered to the well site in bags or in bulk form along with the other materials used in fracturing treatment. Conventional equipment and techniques may be used to place the particles in the formation as a proppant. For example, the particles are mixed with a fracture fluid, which is then injected into a fracture in the formation.

In an exemplary method of fracturing a subterranean formation, a hydraulic fluid is injected into the formation at a rate and pressure sufficient to open a fracture therein, and a fluid containing sintered, substantially round and spherical particles prepared from a slurry as described herein and having one or more of the properties as described herein is injected into the fracture to prop the fracture in an open condition.

Particles appropriately sized for use as a foundry media, typically smaller than that used for proppant, may also be produced according to the methods described herein. Particles produced according to the methods described herein are ceramic media, and therefore have a higher permeability than natural sands currently used in the foundry industry. Thus, the particles produced according to the methods described herein can be expected to vent foundry gases better than sand, thereby reducing gas defects in molds and castings. In addition, ceramic media has a lower thermal expansion than natural quartz silica sand, which also reduces defects. In particular, particles produced according to methods described herein are expected to have a thermal expansion property even lower than that of conventional ceramic media because of the enhanced mullite content (and consequently decreased crystalline silica content).

The foregoing description and embodiments are intended to illustrate the invention without limiting it thereby. It will be understood that various modifications can be made in the invention without departing from the spirit or scope thereof

What is claimed is:

1. A sintered, substantially round and spherical particle, comprising:
    an alumina content of from about 41.5% to 49% by weight;
    a metal oxide sintering aid content of from about 1% to about 6% by weight;
    an apparent specific gravity of from about 2.50 to about 3.00; and
    a bulk density of from about 1.35 g/cm³ to about 1.55 g/cm³.

2. The sintered, substantially round and spherical particle of claim 1 wherein the sintered particle further comprises:
    a seed comprising alumina;
    a coating comprising alumina, wherein the coating comprises at least about 80% of the total volume of the substantially round and spherical sintered particle.

3. The sintered, substantially round and spherical particle of claim 1, wherein the particle comprises a metal oxide sintering aid content of from about 2% to about 6% by weight.

4. The sintered, substantially round and spherical particle of claim 1, wherein the particle further comprises silica and the ratio of alumina to silica is less than 1:1.

5. The sintered, substantially round and spherical particle of claim 4, wherein the ratio of alumina to silica is from about 0.8:1 to about 0.9:1.

6. The sintered, substantially round and spherical particle of claim 1, wherein the particle comprises a bulk density of from about 1.40 g/cm³ to about 1.50 g/cm³.

7. The sintered, substantially round and spherical particle of claim 1, wherein the raw material comprises at least one of kaolin clay, china clay, diaspore clay, ball clay and flint clay.

8. The sintered, substantially round and spherical particle of claim 1, wherein the raw material comprises kaolin clay.

9. The sintered, substantially round and spherical particle of claim 1, wherein the metal oxide sintering aid is selected from the group consisting of iron oxides, magnesium oxide, manganese oxides, titanium oxides, and oxides of the Lanthanide Series of rare earth metals.

10. The sintered, substantially round and spherical particle of claim 9, wherein the metal oxide sintering aid comprises iron oxide.

11. A gas and oil well proppant comprising a plurality of sintered, substantially round and spherical particles, comprising:
    a crush strength at 10,000 psi of from about 5 percent to about 8.5 percent;
    a long term conductivity at 10,000 psi of from about 2500 mD-ft to about 3000 mD-ft;
    a long term permeability at 10,000 psi of more than 140D; and
    a Darcy volume factor at 10,000 psi of more than 110 Darcy-cm³/g;
    wherein said particles comprise:
        an alumina content of from about 41.5% to 49% by weight;
        a metal oxide sintering aid content of from about 1% to about 6% by weight;
        an apparent specific gravity of from about 2.50 to about 3.00; and
        a bulk density of from about 1.35 g/cm³ to about 1.55 g/cm³.

12. The gas and oil well proppant of claim 11, wherein the proppant comprises a crush strength at 10,000 psi of from about 5 percent to about 7.5 percent.

13. The gas and oil well proppant of claim 11, wherein the particles comprise a metal oxide sintering aid content of from about 2% to about 6% by weight.

14. The gas and oil well proppant of claim 11, wherein the particles comprise a bulk density of from about 1.40 g/cm³ to about 1.50 g/cm³.

15. The gas and oil well proppant of claim 11, wherein the proppant has a long term permeability at 10,000 psi of from about 150 to about 175 Darcies.

16. The gas and oil well proppant of claim 11, wherein the proppant has a Darcy volume factor at 10,000 psi of from about 115 to about 125 Darcy-cm³/g.

17. The gas and oil well proppant of claim 11, wherein the metal oxide sintering aid is selected from the group consisting of iron oxides, magnesium oxide, manganese oxides, titanium oxides, and oxides of the Lanthanide Series of rare earth metals.

18. The gas and oil well proppant of claim 17, wherein the metal oxide sintering aid comprises iron oxide.

19. A sintered, substantially round and spherical particle, comprising:
    an alumina content of from about 40% to about 55% by weight;
    a silica content, wherein the ratio of alumina to silica is from about 0.8:1 to 0.9:1;
    a metal oxide sintering aid content of from about 1% to about 6% by weight;

an apparent specific gravity of from about 2.50 to about 3.00; and a bulk density of from about 1.35 g/cm³ to about 1.55 g/cm³.

20. The sintered, substantially round and spherical particle of claim 19 wherein the sintered particle further comprises:

a seed comprising alumina;

a coating comprising alumina, wherein the coating comprises at least about 80% of the total volume of the substantially round and spherical sintered particle.

21. The sintered, substantially round and spherical particle of claim 19, wherein the particle comprises an alumina content of from about 41.5% to about 49%.

22. The sintered, substantially round and spherical particle of claim 19, wherein the particle comprises a metal oxide sintering aid content of from about 2% to about 6% by weight.

23. The sintered, substantially round and spherical particle of claim 19, wherein the particle comprises a bulk density of from about 1.40 g/cm³ to about 1.50 g/cm³.

24. The sintered, substantially round and spherical particle of claim 19, wherein the raw material comprises at least one of kaolin clay, china clay, diaspore clay, ball clay and flint clay.

25. The sintered, substantially round and spherical particle of claim 19, wherein the raw material comprises kaolin clay.

26. The sintered, substantially round and spherical particle of claim 19, wherein the metal oxide sintering aid is selected from the group consisting of iron oxides, magnesium oxide, manganese oxides, titanium oxides, and oxides of the Lanthanide Series of rare earth metals.

27. The sintered, substantially round and spherical particle of claim 26, wherein the metal oxide sintering aid comprises iron oxide.

* * * * *